(12) United States Patent
Kim et al.

(10) Patent No.: US 10,919,361 B2
(45) Date of Patent: Feb. 16, 2021

(54) COOLING MODULE FOR VEHICLE

(71) Applicants: HYUNDAI MOTOR COMPANY, Seoul (KR); KIA MOTORS CORPORATION, Seoul (KR)

(72) Inventors: Yeon Ho Kim, Seoul (KR); Jae Yeon Kim, Hwaseong-si (KR); Wan Je Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 46 days.

(21) Appl. No.: 16/246,942

(22) Filed: Jan. 14, 2019

(65) Prior Publication Data
US 2020/0130456 A1    Apr. 30, 2020

(30) Foreign Application Priority Data
Oct. 30, 2018  (KR) .......................... 10-2018-0131160

(51) Int. Cl.
*B60H 1/00* (2006.01)
*B60H 1/32* (2006.01)
(52) U.S. Cl.
CPC ....... *B60H 1/00328* (2013.01); *B60H 1/3227* (2013.01)
(58) Field of Classification Search
CPC .............. B60H 1/00328; B60H 1/3227; F28D 1/05341; F28D 1/0316; F28D 1/0426; F28D 1/05391; F28D 11/025; F28D 2021/007; F28D 2021/0071; F28D 2021/0084; F28D 2021/0085; F28D 2021/0091
See application file for complete search history.

(56) References Cited

U.S. PATENT DOCUMENTS

| | | | |
|---|---|---|---|
| 6,253,837 B1* | 7/2001 | Seiler ................... | G05D 23/134 165/103 |
| 6,789,613 B1* | 9/2004 | Ozaki ....................... | F01P 3/18 165/132 |
| 7,828,049 B2* | 11/2010 | Yamamoto ............ | F28F 9/0246 165/140 |
| 8,602,093 B2 | 12/2013 | Iwasaki | |

(Continued)

FOREIGN PATENT DOCUMENTS

JP    2017-072309 A    4/2017
KR    10-2017-0079223 A    7/2017

*Primary Examiner* — Gordon A Jones
(74) *Attorney, Agent, or Firm* — Brinks Gilson & Lione

(57) ABSTRACT

A cooling module for a vehicle includes: a high temperature radiator including first and second header tanks into which a coolant flows and from which it is exhausted, and a plurality of tubes and heat radiating fins respectively interconnecting the first and second header tanks; a low temperature radiator including third and fourth header tanks into which a coolant flows and from which it is exhausted, and a plurality of tubes and heat radiating fins respectively interconnecting the third and fourth header tanks; and a condenser disposed at a side surface of the high temperature and low temperature radiators corresponding to the second and fourth header tanks to be respectively connected to the second and fourth header tanks and condensing a refrigerant flowing therein through heat exchange with a coolant supplied from the second and fourth header tanks.

15 Claims, 7 Drawing Sheets

(56) References Cited

U.S. PATENT DOCUMENTS

2009/0301696 A1* 12/2009 Iwasaki .................. F28F 13/06
                                                         165/140
2014/0102679 A1*  4/2014 Matsudaira ........... F28D 1/0461
                                                         165/143

* cited by examiner

COOLING MODULE FOR VEHICLE

CROSS-REFERENCE TO RELATED APPLICATION

This application claims priority to and the benefit of Korean Patent Application No. 10-2018-0131160, filed on Oct. 30, 2018, the entire contents of which are incorporated herein by reference.

FIELD

The present disclosure relates a cooling module for a vehicle. More particularly, the present disclosure relates to a cooling module for a vehicle in which a high temperature radiator and a low temperature radiator are disposed and used depending on an operation temperature.

BACKGROUND

The statements in this section merely provide background information related to the present disclosure and may not constitute prior art.

In general, an air conditioning system of a vehicle maintains the inside of the vehicle at an appropriate temperature regardless of a change of an outside temperature and maintains a pleasant indoor environment.

The air conditioning system includes a compressor compressing a refrigerant, a condenser condensing the refrigerant compressed by the compressor, an expansion valve rapidly expanding the refrigerant that is condensed by the condenser and liquefied, and an evaporator cooling air blown inside a vehicle in which the air conditioning system is installed, by using evaporative latent heat of the refrigerant while evaporating the refrigerant that is expanded by the expansion valve, as main constituent elements.

However, in the aforementioned air conditioner system in the related art, when a water cooling type of condenser is applied when cooling is performed for condensing the refrigerant, the coolant exchanges heat with the refrigerant in the condenser, such that a problem in that power consumption is increased according to an increase in a temperature of the refrigerant at an outlet of the condenser occurs.

We have discovered that since the water cooling type of condenser has higher thermal capacity of a refrigerant than that of the air cooling type of condenser, condensation pressure thereof is low, but a temperature difference between the coolant and the refrigerant is small and a temperature of the coolant is higher than that of external air such that it is difficult to perform sub-cooling, thereby causing a drawback of degrading general cooling performance of the air conditioner system.

A cooling fan and a radiator with large capacity are required in order to ameliorate the drawback, but they additionally cause another drawback in that a layout inside a small engine compartment becomes inefficient, and the entire weight and manufacturing cost of a vehicle are increased.

Further, in order to mount a water-cooled condenser in the small engine compartment, the water-cooled condenser needs to be mounted at a back of a fender or at a back of the engine compartment, such that ensuring adequate space is difficult, a connecting pipe and a disposition layout may be complicated and assembling performance and mounting performance may be deteriorated, and thermal damage to the engine compartment may cause a reduction in performance, thereby leading to an increase in power consumption of a compressor due to an increase in flow resistance of a refrigerant.

In addition, in the case of an environmentally-friendly vehicle to which the motor, electrically driven components, a stack, and the like are applied, the coolant cools each component and then is introduced into the condenser, and thus the temperature thereof is increased such that an amount of condensed refrigerant may be further reduced.

SUMMARY

The present disclosure provides a cooling module for a vehicle, in which a high temperature radiator and a low temperature radiator are disposed and used based on an operation temperature, and in which a condenser receiving a coolant from each of the radiators to cool a refrigerant is integrally configured, thereby increasing condensing performance and improving cooling performance.

The present disclosure also provides a cooling module for a vehicle for improving a package performance and increasing space utilization by integrating the radiator and the condenser into one body.

A cooling module for a vehicle according to an exemplary form of the present disclosure includes: a high temperature radiator including first and second header tanks into which a coolant flows and from which the coolant is exhausted, and a plurality of first tubes and a plurality of first heat radiating fins respectively interconnecting the first header tank and the second header tank; a low temperature radiator including third and fourth header tanks into which a coolant flows and from which the coolant is exhausted, and a plurality of second tubes and a plurality of second heat radiating fins respectively interconnecting the third header tank and the fourth header tank; and a condenser disposed at a side surface of the high temperature and low temperature radiators corresponding to the second and fourth header tanks to be respectively connected to the second and fourth header tanks, the condenser configured to condense a refrigerant flowing therein through heat exchange with the coolant supplied from the second and fourth header tanks.

The condenser may include: a first heat radiating unit connected to the second header tank through a first inflow pipe and a first exhaust pipe, which are respectively provided at positions on a rear surface of the condenser and configured to circulate the coolant supplied from the high temperature radiator; and a second heat radiating unit integrally formed with the first heat radiating unit, connected to the fourth header tank through a second inflow pipe and a second exhaust pipe, which are respectively provided on a front surface of the condenser, and configured to circulate the coolant supplied from the low temperature radiator.

In the condenser, a refrigerant inlet may be formed at a rear upper surface of the condenser, and a refrigerant outlet may be formed at a lower portion of the condenser separated from the refrigerant inlet in a diagonal direction.

The condenser may condense a refrigerant flowing in through the refrigerant inlet through heat exchange with the coolant while sequentially passing through the first heat radiating unit and the second heat radiating unit, and the condenser may exhaust the condensed refrigerant through the refrigerant outlet.

The first inflow pipe may be disposed at an upper portion based on a length direction of the condenser, the first exhaust pipe may be disposed below the first inflow pipe, and the second inflow pipe may be disposed at a position lower than the second exhaust pipe in the length direction of the condenser.

The first heat radiating unit may condense the refrigerant of a gaseous state by using the coolant supplied from the high temperature radiator.

The second heat radiating unit may include: a main heat radiating unit secondarily condensing the refrigerant which is firstly condensed while passing through the first heat radiating unit into a gaseous and liquid mixed state; and a sub-heat radiating unit disposed at a lower portion of the main heat radiating unit in a length direction of the condenser and configured to further condense the refrigerant that is secondarily condensed while passing through the main heat radiating unit.

The coolant supplied from the fourth header tank first passes through the sub-heat radiating unit and is exhausted to the fourth header tank after passing through the main heat radiating unit.

The main heat radiating unit may be connected to the sub-heat radiating unit through a receiver drier, and the receiver drier separates moisture from the condensed refrigerant.

The receiver drier may be disposed outside the second heat radiating unit.

The receiver drier may be disposed between the main heat radiating unit and the sub-heat radiating unit.

The second heat radiating unit may be disposed below the first heat radiating unit, and may be partitioned from the first heat radiating unit to inhibit or prevent mixing of the coolants inside the condenser.

The condenser may be a water-cooled plate heat exchanger in which a plurality of plates are stacked on one another and formed.

A cooling fan may be provided at a rear of the high temperature radiator.

The low temperature radiator may be disposed at a front of the high temperature radiator.

According to the cooling module for the vehicle according to an exemplary form of the present disclosure, a high temperature radiator and a low temperature radiator are disposed and used depending on an operation temperature and a condenser cooling a refrigerant by receiving a coolant from each radiator is integrally configured in one body, thereby increasing condensing performance of the refrigerant and improving cooling performance.

In addition, the present disclosure improves the condensing performance of the refrigerant, thereby reducing the power consumption of the compressor and eliminating the conventional air-cooled type of condenser, thereby reducing manufacturing costs.

Also, the present disclosure may efficiently condense the refrigerant by using the cooling water with different temperatures supplied from the high temperature and low temperature radiators, respectively, thereby increasing the cooling efficiency of the condenser and minimizing the size and capacity increase of the high temperature and low temperature radiators.

The present disclosure may also integrate the high temperature and low temperature radiators and the condensers, thereby improving the package performance and increasing the space utilization.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
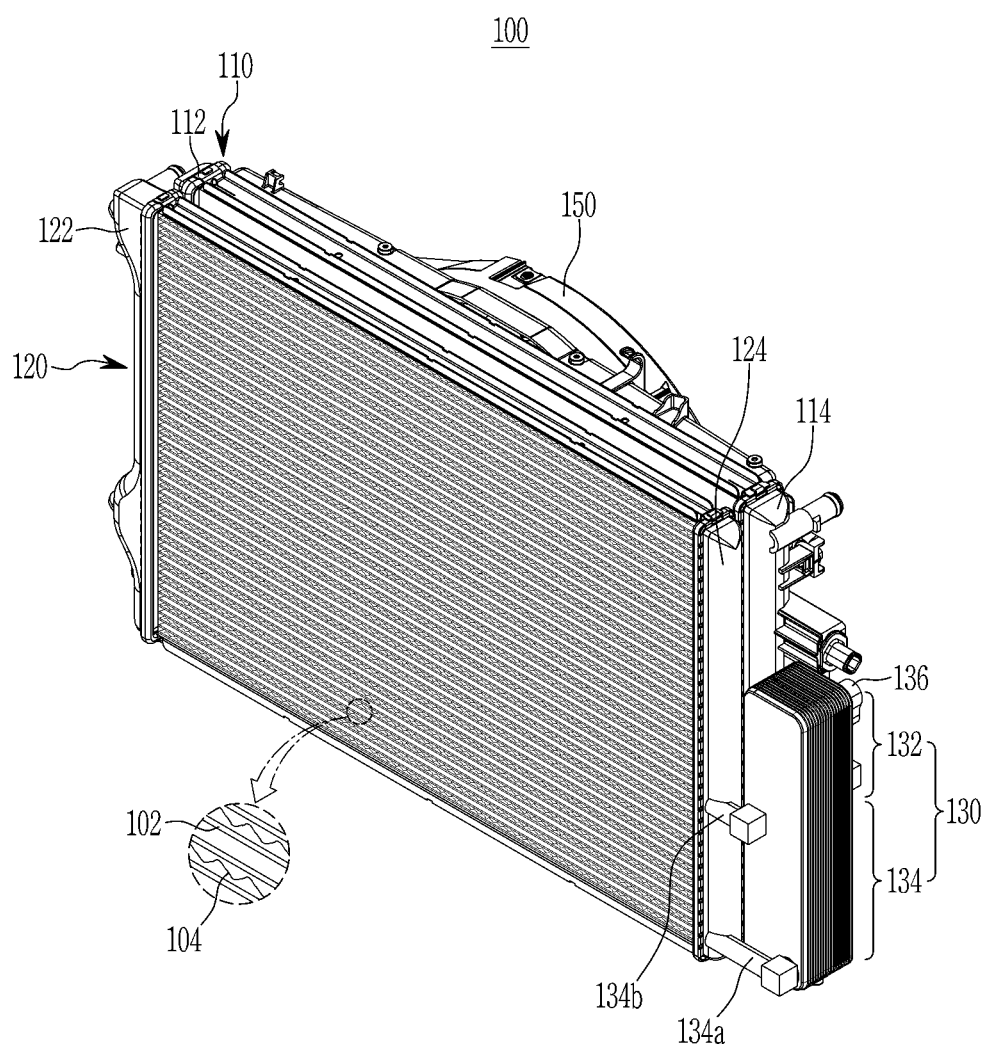
FIG. 1 is a perspective view of a cooling module for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The scheme described in the specification is an exemplary form of the present disclosure and it is to be understood that the present disclosure is not limited to the disclosed form, but, on the contrary, is intended to cover various modifications and equivalent arrangements included within the spirit and scope of the appended claims.

Portions having no relationship with the description will be omitted in order to explicitly explain the present disclosure, and the same reference numerals will be used for the same or similar elements throughout the specification.

In addition, unless explicitly described to the contrary, the word "comprise" and variations such as "comprises" or "comprising" will be understood to imply the inclusion of stated elements but not the exclusion of any other elements.

In addition, a term such as " . . . unit", " . . . means", " . . . part", or " . . . member", which is disclosed in the specification, refers to a unit of an inclusive constituent which performs at least one of functions or operations.

Figure 2:
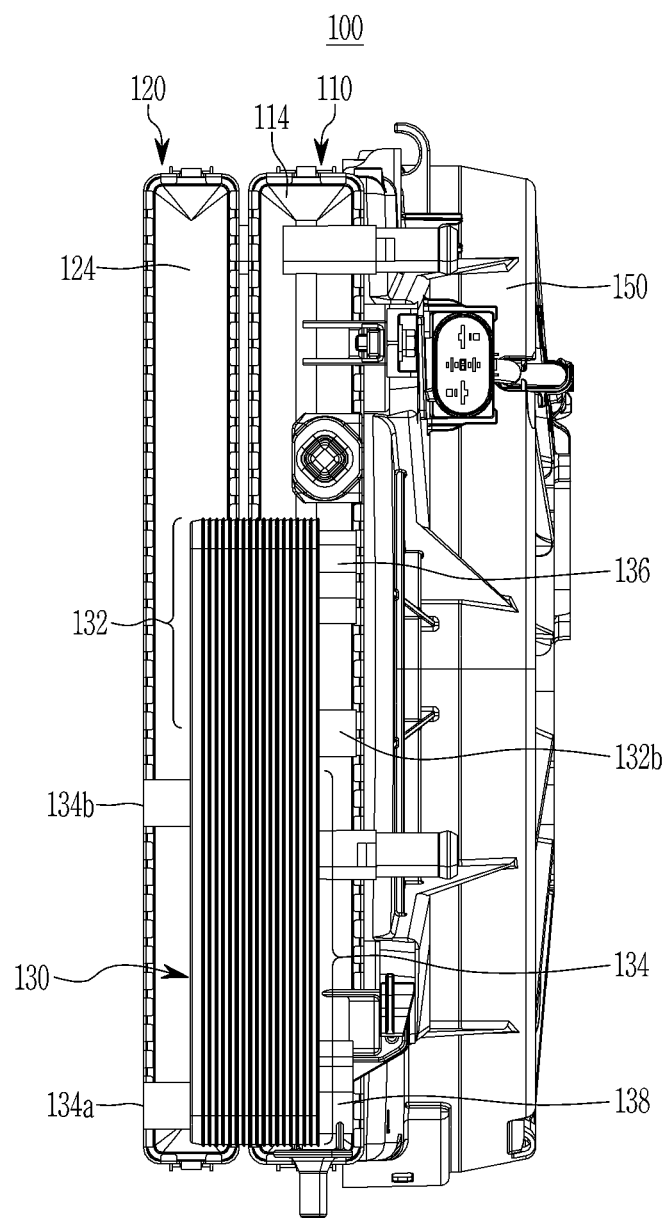
FIG. 2 is a side view of a cooling module for a vehicle according to an exemplary form of the present disclosure.
Figure 3:
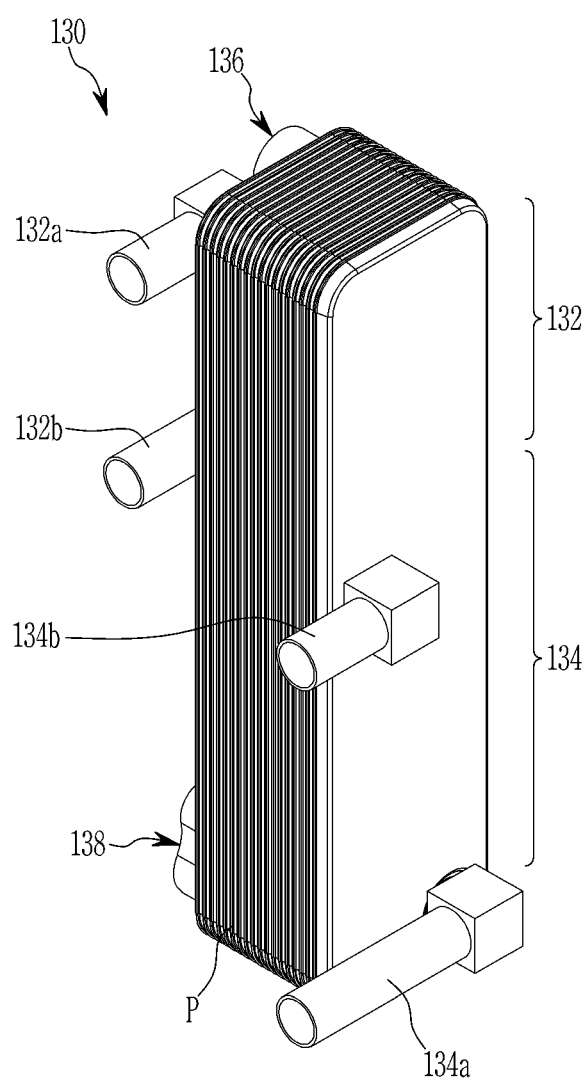
FIG. 3 is a rear perspective view of a condenser applied to a cooling module for a vehicle according to an exemplary form of the present disclosure.
Figure 4:
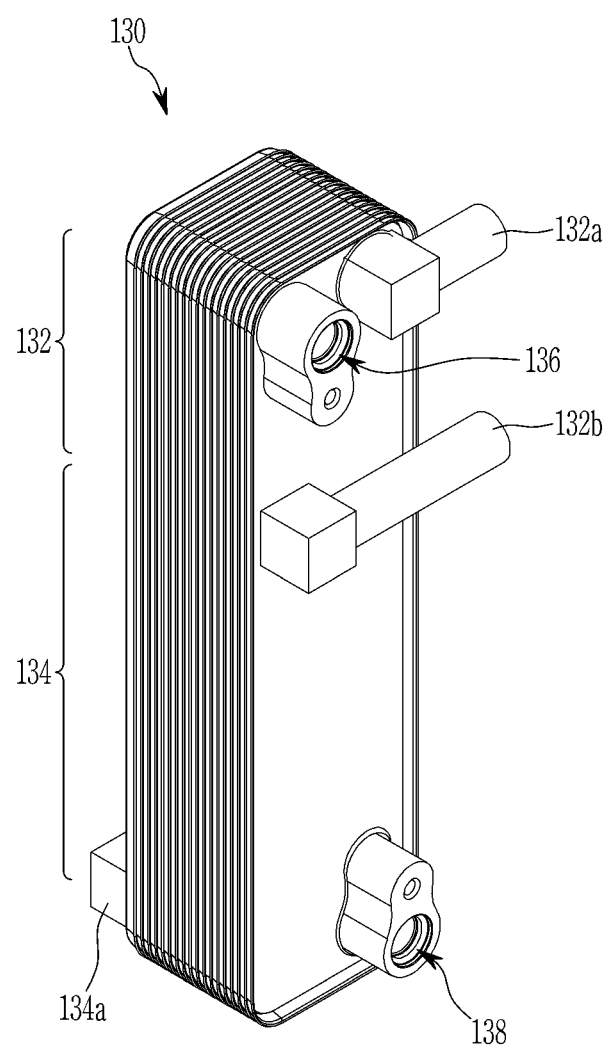
FIG. 4 is a front perspective view of a condenser applied to a cooling module of a vehicle according to an exemplary form of the present disclosure.

FIG. 1 is a perspective view of a cooling module for a vehicle according to an exemplary form of the present disclosure, FIG. 2 is a side view of a cooling module for a vehicle according to an exemplary form of the present disclosure, FIG. 3 is a rear perspective view of a condenser applied to a cooling module for a vehicle according to an exemplary form of the present disclosure, and FIG. 4 is a front perspective view of a condenser applied to a cooling module for a vehicle according to an exemplary form of the present disclosure.

The cooling module 100 for the vehicle according to an exemplary form of the present disclosure includes a high temperature radiator and a low temperature radiator that are used depending on an operation temperature, and integrally includes a condenser cooling a refrigerant by receiving a coolant from each radiator in one body, thereby increasing condensing performance of the refrigerant and improving cooling performance.

For this, as shown in FIG. 1 and FIG. 2, the cooling module 100 for the vehicle includes a high temperature radiator 110, a low temperature radiator 120, and a condenser 130.

First, the high temperature radiator 110 may cool the coolant being supplied to cool a vehicle's drive system.

This high temperature radiator 110 is disposed in front of the vehicle, and an overheated coolant flows therein after cooling the drive system. The coolant flowing into the high temperature radiator 110 is cooled through heat exchange with external air during driving of the vehicle.

Here, the high temperature radiator 110 is equipped with a cooling fan 150 for blowing a wind backward. The cooling fan 150 cools the coolant more efficiently by blowing the wind to the high temperature radiator 110 along with the external air flowing in during travel.

The high temperature radiator 110, on the other hand, includes first and second header tanks 112 and 114 where the coolant flows in and is exhausted, and a plurality of tubes and heat radiating fins that respectively interconnect the first and second header tanks 112 and 114.

Here, the first header tank 112 is disposed at one side based on a width direction of the vehicle, and the coolant cooling the drive system inflows thereto. The second header tank 114 is disposed to be separated from the first header tank 112 by a predetermined interval, and exhausts the coolant of which the cooling is completed.

Also, the plurality of tubes (not shown) and heat radiating fins (not shown) provided in the high temperature radiator 110 connect the first and second header tanks 112 and 114.

Accordingly, in the high temperature radiator 110, the overheated coolant having flowed into the first header tank 112 is cooled through the heat exchange with the external air while passing through the tubes, and the cooled coolant is exhausted through the second header tank 114.

In the present exemplary form, the low temperature radiator 120 is disposed at the front of the high temperature radiator 110. Such a low temperature radiator 120 may cool an electrical device and the like which are heated relatively less than the drive system.

Here, the low temperature radiator 120 may include third and fourth header tanks 122 and 124 where the coolant flows in and is exhausted, and a plurality of tubes 102 and heat radiating fins 104 interconnecting the third and fourth header tanks 122 and 124.

The third header tank 122 is disposed at one side based on the width direction of the vehicle, and the coolant cooling the electric device flows in thereto. The fourth header tank 124 is disposed to be separated from the third header tank 122 by a predetermined interval at the other side based on the width direction of the vehicle, and exhausts the coolant of which the cooling is completed.

The plurality of tubes 102 and heat radiating fins 104 provided in the low temperature radiator 110 connect the third and fourth header tanks 122 and 124.

Accordingly, in the low temperature radiator 120, the overheated coolant inflowed to the third header tank 122 is cooled through the heat exchange with the external air while passing through the tubes 102 and the cooled cooling water is exhausted through the fourth header tank 124.

Also, the condenser 130, as shown in FIG. 2, is disposed at the side of the high temperature and low temperature radiators 110 and 120 corresponding to the second and fourth header tanks 114 and 124, and is connected to the second and fourth header tanks 114 and 124, respectively.

The condenser 130 may condenses the refrigerant having flowed therein through heat exchange with the coolant respectively supplied from the second and fourth header tanks 114 and 124.

Here, the condenser 130 may be a water-cooled plate heat exchanger in which a plurality of plates are stacked.

That is, in the condenser 130, the plurality of plates P may be stacked on one another and disposed to form a plurality of channels which are alternately disposed. Accordingly, the condenser 130 may exchange heat of the refrigerant passing through one channel and the coolant passing through another channel.

In the present exemplary form, the condenser 130, as shown in FIG. 3 and FIG. 4, includes a first heat radiating unit 132 and a second heat radiating unit 134.

The first heat radiating unit 132 is connected to the second header tank 114 through a first inflow pipe 132a and a first exhaust pipe 132b, which are respectively provided at positions on the rear upper surface of the condenser 130 and separated from each other.

In this first heat radiating unit 132, the coolant supplied from the high temperature radiator 110 is circulated.

In the present exemplary form, the first inflow pipe 132a may be positioned at an upper portion with respect to the length direction of the condenser 130, and the first exhaust pipe 132b may be positioned below the first inflow pipe 132a.

The first heat radiating unit 132 thus configured may first condense the refrigerant in the gaseous state by using the coolant supplied from the high temperature radiator 110.

Further, the second heat radiating unit 134 is disposed below the lower part of the first heat radiating unit 132. The second heat radiating unit 134 is connected to the fourth header tank 124 through a second inflow pipe 134a and a second exhaust pipe 134b, which are respectively provided at positions on the front lower surface of the condenser 130 and separated from each other.

Thus, the coolant supplied from the low temperature radiator 120 is circulated in the second heat radiating unit 134.

In the present exemplary form, the second inflow pipe 134a may be disposed downward based on the length direction of the condenser 130, and the second exhaust pipe 134b may be disposed higher than the second inflow pipe 134a.

The second heat radiating unit 134 thus is capable of secondarily condensing the refrigerant that is first condensed while passing through the first heat radiating unit 132 by using the coolant supplied from the low temperature radiator 120.

Meanwhile, the condenser 130 may have a refrigerant inlet 136 formed at the upper portion of the rear surface thereof, and a refrigerant outlet 138 may be formed at the lower portion thereof while being separated from the refrigerant inlet 136 in the diagonal direction.

Accordingly, the condenser 130 may condense the refrigerant inflowing through the refrigerant inlet 136 through the heat exchange with the coolant while sequentially passing through the first heat radiating unit 132 and the second heat radiating unit 134 and exhaust the refrigerant of which the condensing is completed through the refrigerant outlet 138.

Meanwhile, the first heat radiating unit 132 and the second heat radiating unit 134 may be partitioned through a partition wall provided inside the condenser 130. Accordingly, mixing of the coolant passing through the first heat radiating unit 132 and the coolant passing through the second heat radiating unit 134 may be inhibited or prevented.

That is, in the present exemplary form, the refrigerant inflowed to the condenser 130 flows from the first heat radiating unit 132 to the second heat radiating unit 134, and the coolant come from the high temperature and the low temperature radiator 110 and 120 respectively flows in the first heat radiating unit 132 and the second heat radiating unit 134.

Accordingly, the condenser 130 may first condense the refrigerant of a high temperature and high pressure supplied from a compressor by using the coolant supplied from the high temperature radiator 110 in the first heat radiating unit 132.

Next, the condenser 130 may secondarily condense the refrigerant that is first condensed in the first heat radiating unit 132 in the second heat radiating unit 134 by using the coolant of the low temperature radiator 120 having a relatively lower temperature compared with the coolant of the high temperature radiator 110.

As the above-configured cooling module for the vehicle 100 may effectively condense the refrigerant by using the coolant with different temperatures respectively supplied from the high temperature and low temperature radiators 110 and 120, cooling efficiency of the condenser 130 may be improved, and an increase of a size and a capacity of the high temperature and low temperature radiators 110 and 120 may be reduced.

Various exemplary forms of the condenser applied to the cooling module 100 will now be described with reference to FIG. 5 to FIG. 7.

Figure 5:
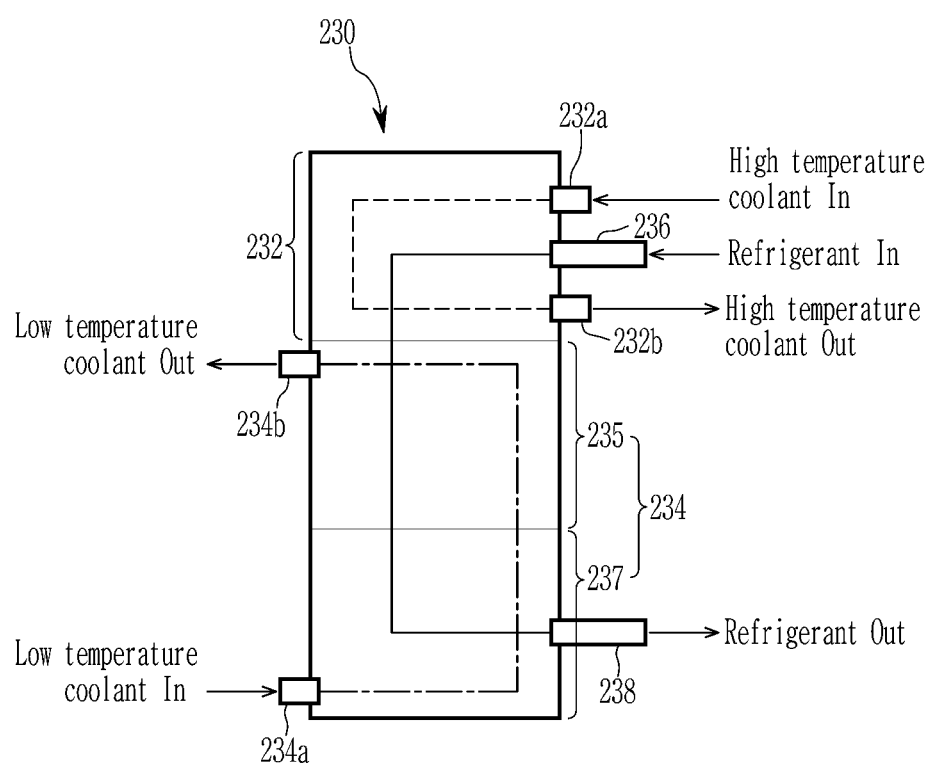
FIG. 5 to FIG. 7 are internal schematic diagrams of a condenser according to various exemplary forms in a cooling module for a vehicle according to an exemplary form of the present disclosure.
Figure 6:
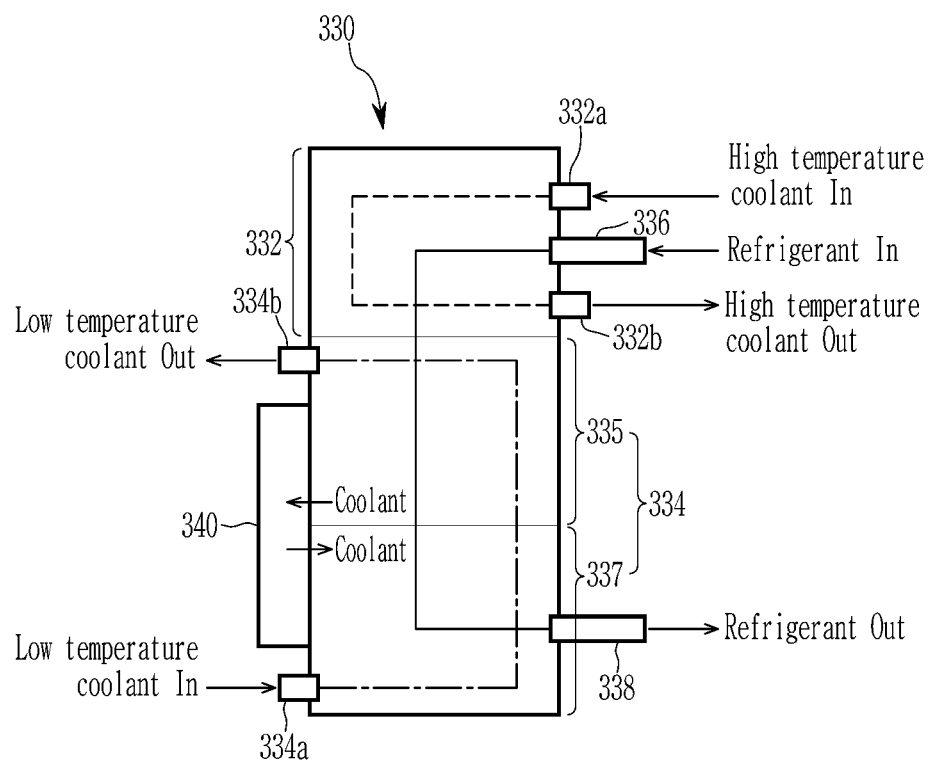
Figure 7:
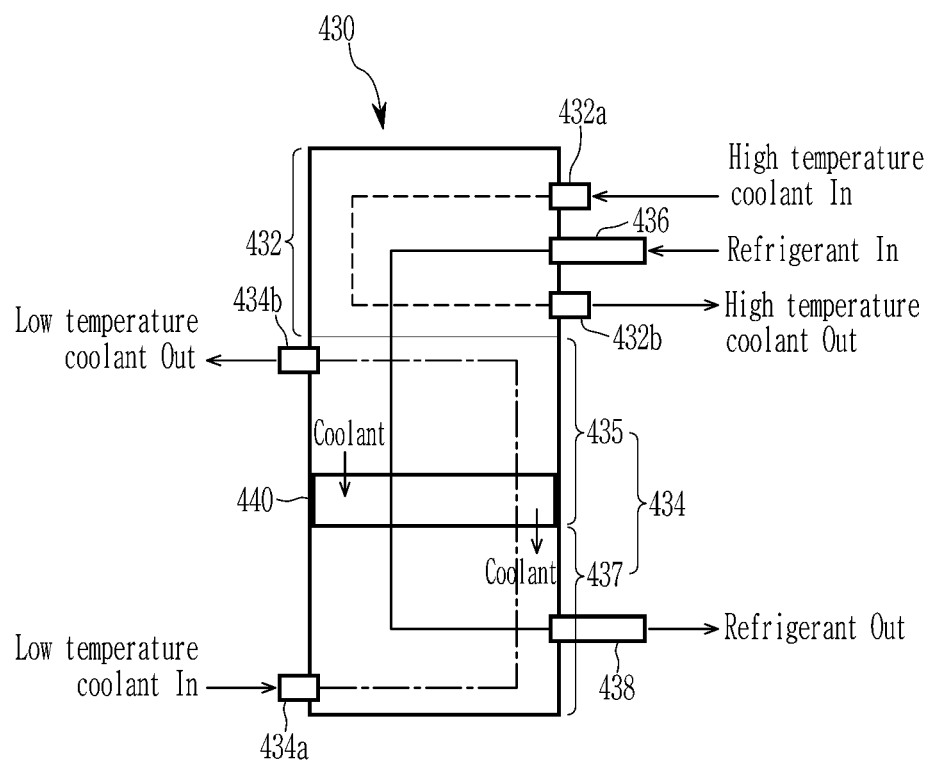

FIG. 5 to FIG. 7 are internal schematic diagrams of a condenser according to various exemplary forms in a cooling module for a vehicle according to an exemplary form of the present disclosure.

Referring to FIG. 5, a condenser 230 according to another exemplary form of the present disclosure includes a first heat radiating unit 232 and a second heat radiating unit 234.

The first heat radiating unit 232 is connected to the second header tank 114 through a first inflow pipe 232a and a first exhaust pipe 232b respectively provided at a position separated from the rear upper surface at the rear upper surface of the condenser 230.

In this first heat radiating unit 232, the coolant of a high temperature supplied from the high temperature radiator 110 is circulated.

In the present exemplary form, the first inflow pipe 232a may be disposed at the upper portion with respect to the length direction of the condenser 230, and the first exhaust pipe 232b may be disposed below the first inflow pipe 232a.

The first heat radiating unit 232 thus configured may first condense the refrigerant in the gaseous state by using the coolant supplied from the high temperature radiator 110.

Also, the second heat radiating unit 234 is disposed below the first heat radiating unit 232. The second heat radiating unit 234 is connected to the fourth header tank 124 through a second inflow pipe 234a and a second exhaust pipe 234b respectively provided at positions separated from the front lower surface of the condenser 230.

Thus, in the second heat radiating unit 234, the coolant with a low temperature supplied from the low temperature radiator 120 is circulated.

In the present exemplary form, the second inflow pipe 234a may be disposed at the lower portion based on a length direction of the condenser 230, and the second exhaust pipe 234b may be disposed above the second inflow pipe 234a.

Here, the second heat radiating unit 234 may include a main heat radiating unit 235 and a sub-heat radiating unit 237.

The main heat radiating unit 235 may secondarily condense the gaseous and liquid mixed refrigerant that is firstly condensed while passing through the first heat radiating unit 232.

The sub-heat radiating unit 237 is disposed at the bottom of the main heat radiating unit 235 with respect to the length direction of the condenser 230, and may further condense the refrigerant that is secondly condensed while passing through the main heat radiating unit 235.

The above-configured second heat radiating unit 234 may secondary condense the refrigerant that is first condensed in the first heat radiating unit 232 in the main heat radiating unit 235 by using the coolant supplied from the low temperature radiator 120. Next, the second heat radiating unit 234 may thirdly condense the refrigerant that is secondarily condensed in the main heat radiating unit 235 in the sub-heat radiating unit 237.

Meanwhile, the condenser 230 may have a refrigerant inlet 236 formed at the rear surface thereof and a refrigerant outlet 238 formed at the lower portion thereof and separated from the refrigerant inlet 236 in the diagonal direction.

Accordingly, the condenser 230 may condense the refrigerant inflowed through the refrigerant inlet 236 with the coolant through the heat exchange while sequentially passing through the first heat radiating unit 232, and the main heat radiating unit 235 and the sub-heat radiating unit 237 of the second heat radiating unit 234, and may exhaust the refrigerant of which the condensing is completed through the refrigerant outlet 238.

Further, the first heat radiating unit 232 and the second heat radiating unit 234 may be partitioned through a partition wall provided inside the condenser 230. Thus, the mixing of the coolant passing through the first heat radiating unit 232 and the coolant passing through the second heat radiating unit 234 may be prevented.

That is, in the present exemplary form, the refrigerant inflowed to the condenser 230 may flow from the first heat radiating unit 232 to the second heat radiating unit 234, and the coolant inflowed from the high temperature and low temperature radiators 110 and 120 may respectively flow in the first heat radiating unit 232 and the second heat radiating unit 234.

The condenser 230 configured in this way may first condense the refrigerant of a high temperature and a high pressure supplied from the compressor by using the coolant supplied from the high temperature radiator 110 in the first heat radiating unit 232.

Next, the condenser 230 may secondarily condense the refrigerant first condensed in the first heat radiating unit 232 by using the coolant of the low temperature radiator 120 having a relatively lower temperature than the coolant of the high temperature radiator 110 in the main heat radiating unit 235, and may thirdly condense it in the sub-heat radiating unit 237.

Here, the coolant supplied from the fourth header tank 124 may first pass through the sub-heat radiating unit 237, and may be exhausted to the fourth header tank 124 after passing through the main heat radiating unit 235.

That is, as the refrigerant additionally exchanges heat with the coolant that first inflows to the sub-heat radiating unit 237 and has the relatively low temperature, the cooling efficiency may be improved and a condensation rate may be increased.

Referring to FIG. 6, a condenser 330 according to another exemplary form of the present disclosure includes a first heat radiating unit 332 and a second heat radiating unit 334.

The first heat radiating unit 332 is connected to the second header tank 114 through a first inflow pipe 332a and a first exhaust pipe 332b respectively provided at the positions that are separated from the rear upper surface at the rear upper surface of the condenser 330.

In this first heat radiating unit 332, the coolant supplied from the high temperature radiator 110 is circulated.

In the present exemplary form, the first inflow pipe 332a may be disposed at the upper portion based on the length direction of the condenser 330, and the first exhaust pipe 332b may be disposed below the first inflow pipe 332a.

The first heat radiating unit 332 thus configured may first cool the refrigerant of the gaseous state by using the coolant of a high temperature supplied from the high temperature radiator 110.

Also, the second heat radiating unit 334 is disposed at the lower portion of the first heat radiating unit 332. The second heat radiating unit 334 is connected to the fourth header tank 124 through a second inflow pipe 334a and a second exhaust pipe 334b respectively provided at the positions that are separated from the front lower surface of the condenser 330.

Thus, in the second heat radiating unit 334, the coolant of a low temperature supplied from the low temperature radiator 120 is circulated.

In the present exemplary form, the second inflow pipe 334a may be disposed at the lower portion based on the length direction of the condenser 330, and the second exhaust pipe 334b may be disposed above the second inflow pipe 334a.

Here, the second heat radiating unit 334 may include a main heat radiating unit 335 and a sub-heat radiating unit 337.

The main heat radiating unit 335 may secondarily condense the gaseous and liquid mixed refrigerant that is firstly condensed while passing through the first heat radiating unit 332.

The sub-heat radiating unit 337 is disposed at the bottom of the main heat radiating unit 235 with respect to the length direction of the condenser 330, and may further condense the refrigerant that is secondly condensed while passing through the main heat radiating unit 335.

The above-configured second heat radiating unit 334 may secondary condense the refrigerant that is first condensed in the first heat radiating unit 232 in the main heat radiating unit 335 by using the coolant supplied from the low temperature radiator 120. Next, the second heat radiating unit 334 may thirdly condense the refrigerant that is secondarily condensed in the main heat radiating unit 335 in the sub-heat radiating unit 337.

Meanwhile, the condenser 330 may have a refrigerant inlet 336 formed at the rear surface thereof and a refrigerant outlet 338 formed at the lower portion thereof and separated from the refrigerant inlet 236 in the diagonal direction.

Accordingly, the condenser 330 may condense the refrigerant inflowed through the refrigerant inlet 336 with the coolant through the heat exchange while sequentially passing through the first heat radiating unit 332, and the main heat radiating unit 335 and the sub-heat radiating unit 337 of the second heat radiating unit 334, and may exhaust the refrigerant of which the condensing is completed through the refrigerant outlet 338.

On the other hand, in the present exemplary form, the main heat radiating unit 335 may be connected to the sub-heat radiating unit 337 through a receiver drier 340 for gas-liquid separation of the refrigerant that is condensed, while passing through the inside of the receiver drier.

The receiver drier 340 is internally provided with a desiccant, and may be disposed to the outside of the second heat radiating unit 334.

Accordingly, the refrigerant passing through the main heat radiating unit 327 may inflow to the sub-heat radiating unit 337 in the state of gas-liquid separation, and moisture is separated and removed from the condensed refrigerant while passing through the receiver drier 340.

Further, the first heat radiating unit 332 and the second heat radiating unit 334 may be partitioned through a partition wall provided inside the condenser 330. Thus, the mixing of the coolant passing through the first heat radiating unit 332 and the coolant passing through the second heat radiating unit 334 may be prevented.

That is, in the present exemplary form, the refrigerant inflowed to the condenser 330 may inflow from the first heat radiating unit 332 to the second heat radiating unit 334, and the coolant inflowed from the high temperature and low temperature radiators 110 and 120 may respectively inflow in the first heat radiating unit 332 and the second heat radiating unit 334.

The condenser 330 configured in this way may first condense the refrigerant of a high temperature and high pressure supplied from the compressor by using the coolant supplied from the high temperature radiator 110 in the first heat radiating unit 332.

Next, the condenser 330 may secondarily condense the refrigerant first condensed in the first heat radiating unit 332 by using the coolant of the low temperature radiator 120 having a relatively lower temperature than the coolant of the high temperature radiator 110 in the main heat radiating unit 335, and may thirdly condense it in the sub-heat radiating unit 337.

At this time, the refrigerant exhausted from the main heat radiating unit 335 may be inflowed to the sub-heat radiating unit 337 with gas-liquid separation and moisture removal by passing through the receiver drier 340.

Here, the coolant supplied from the fourth header tank 124 may first pass through the sub-heat radiating unit 337 and be exhausted to the fourth header tank 124 after passing through the main heat radiating unit 335.

In other words, the refrigerant is first inflowed to the sub-heat radiating unit 337 to further exchange heat with the coolant with a relatively low temperature, thereby improving the cooling efficiency and increasing the condensation rate.

Finally, referring to FIG. 7, a condenser 430 according to another exemplary form of the present disclosure includes a first heat radiating unit 432 and a second heat radiating unit 434.

First, the first heat radiating unit 432 is connected to the second header tank 114 via a first inflow pipe 432a and the first exhaust pipe 432b, respectively, which are disposed at the rear upper portion of the condenser 430 and at a position spaced apart from the upper rear portion.

In this first heat radiating unit 432, the coolant supplied from the high temperature radiator 110 is circulated.

In the present exemplary form, the first inflow pipe 432a may be disposed at the upper portion with respect to the length direction of the condenser 430, and the first exhaust pipe 432b may be disposed below the first inflow pipe 432a.

The first heat radiating unit 432 thus configured may first condense the refrigerant of the gaseous state by using the coolant of a high temperature supplied from the high temperature radiator 110.

The second heat radiating unit 434 is disposed below the first heat radiating unit 432. The second heat radiating unit 434 is connected to the fourth header tank 124 via a second inflow pipe 434a and a second exhaust pipe 434b, which are provided at positions separated from the front lower portion of the condenser 430.

Thus, in the second heat radiating unit 434, the coolant of a low temperature supplied from the low temperature radiator 120 is circulated.

In the present exemplary form, the second inflow pipe 434a may be disposed at the lower portion based on the length direction of the condenser 430, and the second exhaust pipe 434b may be disposed above the second inflow pipe 434a.

The second heat radiating unit 434 may include a main heat radiating unit 435 and a sub-heat radiating unit 437.

The main heat radiating unit 435 may secondarily condense the refrigerant that is first condensed while passing through the first heat radiating unit 432 in the mixed state of the gas and the liquid.

The sub-heat radiating unit 437 is disposed below the main heat radiating unit 435 with respect to the length direction of the condenser 430, and may further condense the refrigerant that is secondarily condensed while passing through the main heat radiating unit 435.

The second heat radiating unit 434 thus configured may secondarily condense the refrigerant that is first condensed in the first heat radiating unit 432 in the main heat radiating unit 435 by using the coolant supplied from the low temperature radiator 120. Then, the second heat radiating unit 434 may thirdly condense the refrigerant that is secondarily condensed in the main heat radiating unit 435 in the sub-heat heat radiating unit 437.

Meanwhile, the condenser 430 may have a refrigerant inlet 436 formed at the upper portion of the rear surface thereof and a refrigerant outlet 438 formed at the lower portion thereof separated from the refrigerant inlet 436 in the diagonal direction.

Accordingly, the condenser 430 may condense the refrigerant inflowed through the refrigerant inlet 436 with the coolant through heat exchange while sequentially passing it through the first heat radiating unit 432, and the main heat radiating unit 435 and the sub-heat radiating unit 437 of the second heat radiating unit 434, and may exhaust the refrigerant of which the condensing is completed through the refrigerant outlet 438.

Meanwhile, in the present exemplary form, the main heat radiating unit 435 may be connected to the sub-heat radiating unit 437 through a receiver drier 440 that removes moisture and performs gas-liquid separation of the condensed refrigerant while passing through the inside thereof.

The receiver drier 440 may include the desiccant, and may be provided between the main heat radiating unit 435 and the sub-heat radiating unit 437 based on the length direction of the condenser 430.

Accordingly, the refrigerant passing through the main heat radiating unit 427 may be inflowed to the sub-heat radiating unit 437 with the gas-liquid separation and moisture removal while passing through the receiver drier 440.

Meanwhile, the first heat radiating unit 432 and the second heat radiating unit 434 may be partitioned through the partition wall provided inside the condenser 430. Thus, the mixing of the coolant passing through the first heat radiating unit 432 and the coolant passing through the second heat radiating unit 434 may be prevented.

That is, in the present exemplary form, the refrigerant inflowed to the condenser 430 flows from the first heat radiating unit 432 to the second heat radiating unit 434, and the coolant inflowed from the low temperature radiators 110 and 120 may respectively inflow in the first heat radiating unit 432 and the second heat radiating unit 434.

The condenser 430 thus configured may first condense the high temperature high pressure refrigerant supplied by the compressor by using the coolant supplied from the high temperature radiator 110 in the first heat radiating unit 432.

Next, the condenser 430 may secondarily condense the refrigerant first condensed in the first heat radiating unit 432 in the main heat radiating unit 435 and may thirdly condense it in the sub-heat radiating unit 437 by using the coolant of the low temperature radiator 120 having the relatively lower temperature than the coolant of the high temperature radiator 110.

At this time, the refrigerant exhausted from the main heat radiating unit 435 may be inflowed to the sub-heat radiating unit 437 in the state of gas-liquid separation and moisture removal by passing through the receiver drier 440.

Here, the coolant supplied from the fourth header tank 124 may first pass through the sub-heat radiating unit 437 and may be exhausted to the fourth header tank 124 after passing through the main heat radiating unit 435.

In other words, the refrigerant is first inflowed to the sub-heat radiating unit 437 to further exchange heat with the coolant with a relatively low temperature, thereby improving the cooling efficiency and increasing the condensation rate.

Thus, when applying the cooling module 100 for the vehicle according to an exemplary form of the present disclosure as described above, the high temperature radiator 110 and the low temperature radiator 120 are arranged depending on the operation temperature, and the condenser (130, 230, 330, and 440) receives the coolant from the high temperature and low temperature radiators 110 and 120 to cool the refrigerant are integrally configured, thereby increasing the condensing performance of the refrigerant and improving the cooling performance.

In addition, the present disclosure improves the condensing performance of the refrigerant, thereby reducing power consumption of the compressor and eliminating the conventional air-cooled type the condenser, thereby reducing manufacturing costs.

Also, the present disclosure may efficiently condense the refrigerant by using the coolants with different temperatures supplied from the high temperature and low temperature radiators 110 and 120, thereby increasing the cooling efficiency of the condenser (130, 230, 330, and 440) and reducing a size and capacity increase of the high temperature and low temperature radiators 110 and 120.

Further, the present disclosure may integrate the high temperature and low temperature radiators 110 and 120 and the condenser (130, 230, 330 and 440), thereby improving package performance and increasing space utilization.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

100: cooling module
110: high temperature radiator 112, 114, 122, 124: first, second, third, and fourth header tanks
120: low temperature radiator
130, 230, 330, 430: condenser
132, 232, 332, 432: first heat radiating unit
132a, 232a, 332a, 432a: first inflow pipe
132b, 232b, 332b, 432b: first exhaust pipe
134, 234, 334, 434: second heat radiating unit
134a, 234a, 334a, 434a: second inflow pipe
134b, 234b, 334b, 434b: second exhaust pipe
136, 236, 336, 436: refrigerant inlet
138, 238, 338, 438: refrigerant outlet
235, 335, 435: main heat radiating unit
237, 337, 437: sub-heat radiating unit
340, 440: receiver drier

What is claimed is:

1. A cooling module for a vehicle, comprising:
a high temperature radiator including: a first header tank into which a first coolant flows, a second header tank from which the first coolant is discharged, and a plurality of first tubes and a plurality of first heat radiating fins respectively interconnecting the first header tank and the second header tank;
a low temperature radiator including: a third header tank into which a second coolant flows, a fourth header tank from which the second coolant is discharged, and a plurality of second tubes and a plurality of second heat radiating fins respectively interconnecting the third header tank and the fourth header tank; and
a condenser disposed at a side surface of the high temperature and low temperature radiators corresponding to the second and fourth header tanks to be respectively connected to the second and fourth header tanks, the condenser configured to condense a refrigerant flowing therein through heat exchange with the first coolant and second coolant respectively discharged from the second and fourth header tanks.

2. The cooling module for the vehicle of claim 1, wherein the condenser includes:
a first heat radiating unit connected to the second header tank through a first inflow pipe and a first exhaust pipe, which are respectively provided at positions on a rear surface of the condenser and configured to circulate the first coolant supplied from the high temperature radiator; and
a second heat radiating unit integrally formed with the first heat radiating unit, connected to the fourth header tank through a second inflow pipe and a second exhaust pipe, which are respectively provided on a front surface of the condenser, and configured to circulate the second coolant supplied from the low temperature radiator,
the first heat radiating unit and the second heat radiating unit respectively include a plurality of plates configured to form a plurality of flow channels for the refrigerant, the first coolant, and the second coolant.

3. The cooling module for the vehicle of claim 2, wherein, a refrigerant inlet is formed at a rear upper surface of the condenser, and a refrigerant outlet is formed at a lower portion of the condenser and separated from the refrigerant inlet in a diagonal direction.

4. The cooling module for the vehicle of claim 3, wherein the condenser condenses a refrigerant flowing in through the refrigerant inlet through heat exchange with the first coolant and second coolant while sequentially passing through the first heat radiating unit and the second heat radiating unit, and the condenser exhausts the condensed refrigerant through the refrigerant outlet.

5. The cooling module for the vehicle of claim 2, wherein the first inflow pipe is disposed at an upper portion based on a length direction of the condenser,
the first exhaust pipe is disposed below the first inflow pipe, and
the second inflow pipe is disposed at a position lower than the second exhaust pipe in the length direction of the condenser.

6. The cooling module for the vehicle of claim 2, wherein the first heat radiating unit condenses the refrigerant of a gaseous state by using the first coolant supplied from the high temperature radiator.

7. The cooling module for the vehicle of claim 2, wherein the second heat radiating unit includes:
a main heat radiating unit secondarily condensing the refrigerant, which is first condensed while passing through the first heat radiating unit, into a gaseous and liquid mixed state; and
a sub-heat radiating unit disposed at a lower portion of the main heat radiating unit in a length direction of the condenser and configured to further condense the refrigerant that is secondarily condensed while passing through the main heat radiating unit.

8. The cooling module for the vehicle of claim 7, wherein the coolant supplied from the fourth header tank first passes through the sub-heat radiating unit and is exhausted to the fourth header tank after passing through the main heat radiating unit.

9. The cooling module for the vehicle of claim 7, wherein the main heat radiating unit is connected to the sub-heat radiating unit through a receiver drier, and the receiver drier separates moisture from the condensed refrigerant.

10. The cooling module for the vehicle of claim 9, wherein
the receiver drier is disposed outside the second heat radiating unit.

11. The cooling module for the vehicle of claim 9, wherein
the receiver drier is disposed between the main heat radiating unit and the sub-heat radiating unit.

12. The cooling module for the vehicle of claim 2, wherein
the second heat radiating unit is disposed below the first heat radiating unit, and is partitioned from the first heat radiating unit to inhibit or prevent mixing of the first and second coolants inside the condenser.

13. The cooling module for the vehicle of claim 1, wherein
the condenser is a water-cooled plate heat exchanger in which a plurality of plates are stacked on one another and formed.

14. The cooling module for the vehicle of claim 1, wherein
a cooling fan is provided at a rear of the high temperature radiator.

15. The cooling module for the vehicle of claim 1, wherein
the low temperature radiator is disposed at a front of the high temperature radiator.

* * * * *